Aug. 18, 1964  H. B. ANDREW  3,145,341
CORRELATION MEANS FOR A DIRECTION FINDING SYSTEM
Filed Jan. 3, 1961  3 Sheets-Sheet 1
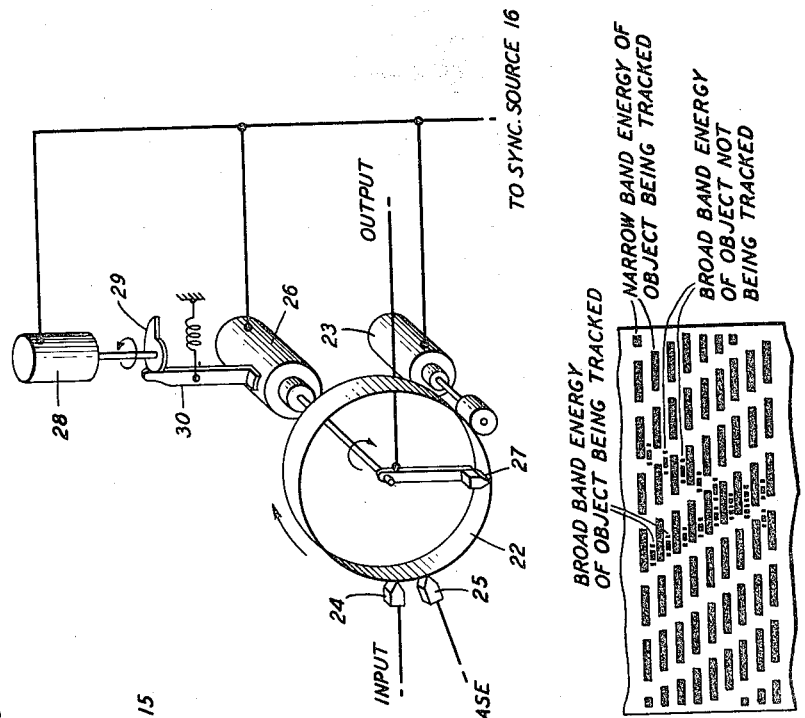
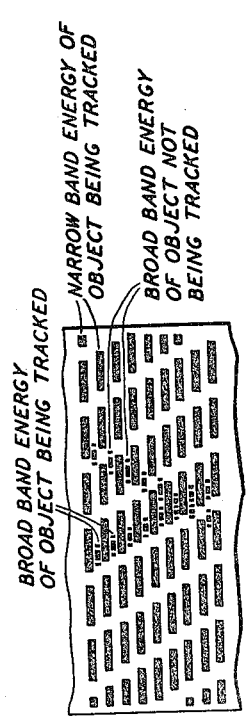
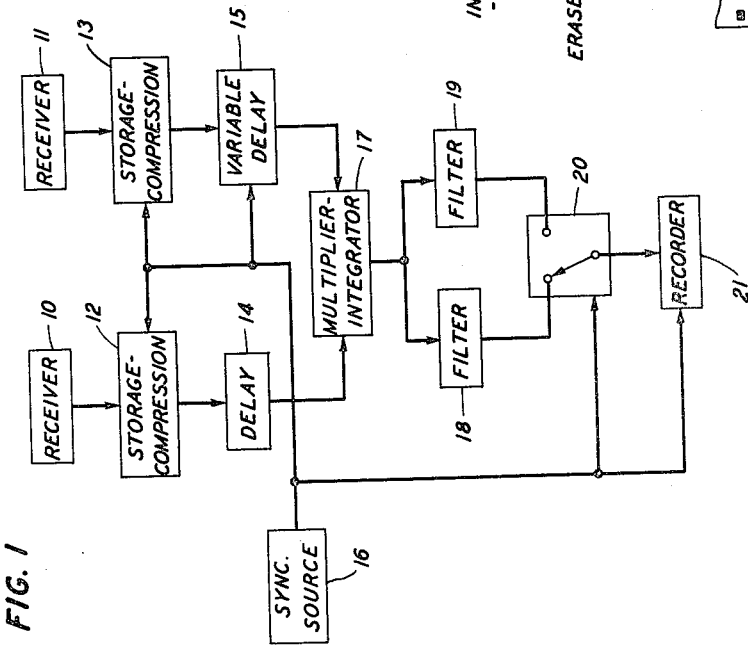
INVENTOR
H.B. ANDREW
BY
ATTORNEY Aug. 18, 1964  H. B. ANDREW  3,145,341
CORRELATION MEANS FOR A DIRECTION FINDING SYSTEM
Filed Jan. 3, 1961  3 Sheets-Sheet 2
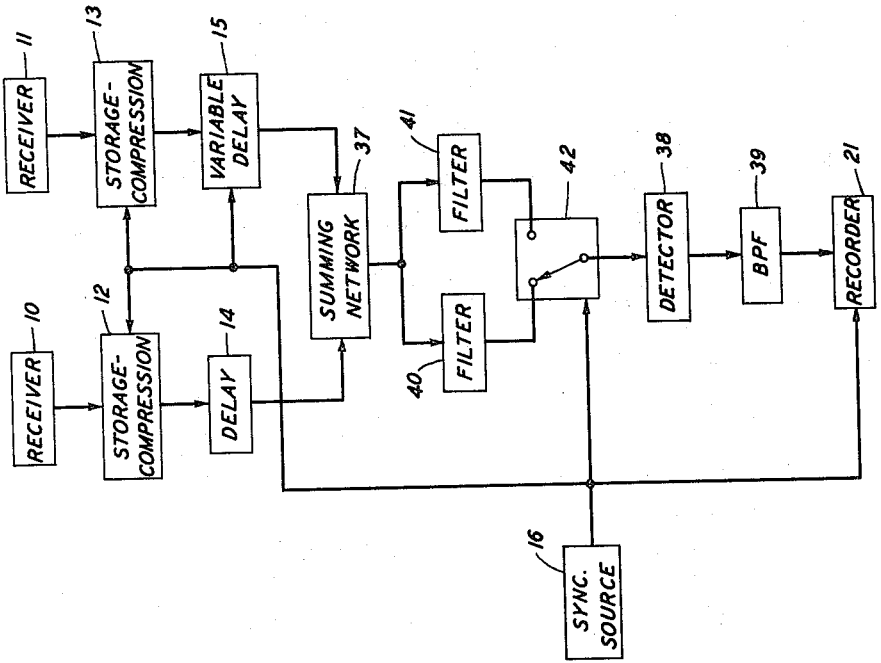
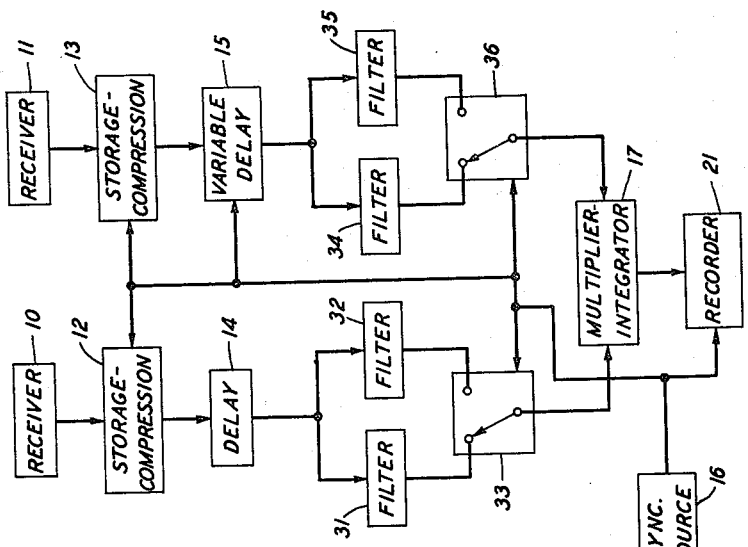
INVENTOR
H. B. ANDREW
BY
ATTORNEY

3,145,341
CORRELATION MEANS FOR A DIRECTION FINDING SYSTEM

Harold B. Andrew, Chatham, N.J., assignor to Bell Telephone Laboratories, Incorporated, New York, N.Y., a corporation of New York
Filed Jan. 3, 1961, Ser. No. 80,490
10 Claims. (Cl. 325—472)

This invention relates to object location and in particular to the determination of the bearing angles of objects radiating energy.

It is well known in the direction finding art that the amount of delay required to delay signals received by a first receiver until they coincide with the same signals received by a second receiver is related to the bearing angle of the object emitting the signals. (The delaying and comparing steps are referred to in the art as correlation detection.) When, however, a broad-band arrangement is used and more than one broad-band signal emitting object are present, a number of bearing angles are produced and it is impossible to determine which of the bearing angles is that of the object of interest. As most objects of interest, such as aircraft or submarines, also emit substantially continuous narrow-band signals, it is frequently possible to eliminate this ambiguity through the use of narrow-band arrangements. When using a narrow-band arrangement, however, ambiguities may still occur as more than one bearing angle may be produced for the object when the wavelength of the narrow-band signals is less than the spacing between the receivers.

To eliminate the above-described ambiguities, broadband and narrow-band arrangements have been used together. In particular, a human operator compares the charts produced by the respective arrangements and then makes a decision as to which of the bearing angles is that of the object of interest. This procedure is, however, not only slower than sometimes desired but is subject to human error.

An object of the present invention is to produce, for objects emitting both broad-band and narrow-band signals, bearing angle information in a manner which is both faster and subject to less misinterpretation by a human operator than heretofore possible.

These and other objects are achieved in accordance with the invention in one of its broader aspects by first temporarily recording successive portions of the outputs from a pair of receivers. These temporary recordings are continuously scanned at a rate at least twice the recording rate to produce a pair of outputs in which successive portions of the receiver outputs are time compressed and repeated at least once. As the time-compressed outputs are produced, alternate time-compressed portions in the outputs are correlated in a broad-band sense while the remaining time-compressed portions are correlated in a narrow-band sense so that substantially only those components related to the narrow-band signals emitted by the object of interest are correlated. The alternately produced broad-band and narrow-band correlation outputs are in turn recorded on a chart which advances at a substantially constant rate. When more than one source of broad-band energy are present, the broad-band correlation output causes a number of broken bearing lines (which generally are not parallel) equal to the number of sources to be produced on the chart. Furthermore, when the wavelength of the narrow-band energy received by the receivers is less than the spacing between the receivers, the narrow-band correlation output may cause more than one broken bearing line to appear on the chart. The true broad-band and narrow-band bearing lines, however, coincide and result in a substantially unbroken line appearing on the chart. This line is readily distinguishable from the remaining lines.

In accordance with a feature of the invention, time compressing in the above-described manner makes all of the information contained in the receiver outputs available at least twice during a time interval equal to that during which it appears in the receiver outputs so that both broad-band and narrow-band correlation of the device outputs may be performed without degrading either of the correlation outputs. This may be readily appreciated by considering the scanning rate to be twice the recording rate so that each of the successive portions of the receiver outputs is time compressed twice by a factor or two. As a result of this time compression, the frequency of each of the components in the time-compressed portions is twice that of the corresponding component in the uncompressed portions with the result that the bandwidths of the compressed portions are twice those of the uncompressed portions. Because the bandwidths have been doubled, each of the compressed portions contains the same information that is present in its corresponding uncompressed portions and all of the original information appears twice within the compressed outputs.

Various known arrangements may be employed to time compress the receiver outputs. An arrangement used in one of the embodiments of the invention comprises a magnetic drum, a recording head, a pick-up head and an erasing head. In operation the drum is rotated at a constant rate past the recording head. Just prior to the return of each part of the drum to the recording head, the erasing head erases any previous recording. New information is therefore continuously being recorded while previously recorded information is being removed. The pick-up head rotates at a constant rate in the same direction as the drum but at a rate at least three times that of the drum. The compression factor produced by such an arrangement is equal to the ratio of the pick-up head speed of rotation minus the drum speed of rotation to the drum speed of rotation. Furthermore, each portion of the input to the recording head appears in the pick-up head output (in a compressed form) a number of times equal to this ratio.

There are several basic correlating techniques which may be employed when using the present invention. One of these basic techniques involves the steps of introducing a variable delay between the signals to be correlated, multiplying together the results of the delaying process, integrating the results of the multiplying process and recording the integrated output. This technique is discussed in detail in the article, "An Analog Electronic Correlator for Acoustic Measurements" by K. W. Goff, beginning on page 223 of the March 1955 issue of the Journal of the Acoustical Society of America and in several of the references cited in this article. Another correlating technique that may be employed involves the steps of introducing a variable delay between the signals to be correlated, summing these signals, submitting the summed output to a detector and then recording the detected output.

In one of the embodiments of the invention in which a pair of the previously described magnetic drum arrangements are used for time compression, the variable delay required for correlation detection is advantageously introduced by continuously changing the rotational speed of one of the pick-up heads while maintaining constant the rotation speed of the other pick-up head. This may be readily accomplished, for example, by rocking the stator of one of the pick-up head drive motors through the use of a continuously driven cam.

As discussed previously the time-compressed outputs comprise successive portions of the receiver outputs which have been time compressed and repeated at least once.

In accordance with a feature of the invention, broadband and narrow-band filter arrangements are controlled so that alternate time-compressed portions are in effect correlated in a broad-band sense while the remaining time-compressed portions are in effect correlated in a narrow-band sense. In several embodiments of the invention, broad-band and narrow-band filters are alternately switched, in synchronism with the compressed portions, into the signal paths where the combined compressed portions appear. In other embodiments of the invention broad-band and narrow-band filters are alternately switched, in synchronism with the compressed portions, into the signal paths where only the compressed portions appear.

Other objects and features of the invention will become apparent from the following detailed description of several illustrative embodiments.

In the drawings:

FIGS. 1, 4, 5 and 6 are block diagrams of several embodiments of the invention;

FIG. 2 illustrates a storage-compression and variable delay arrangement that may be used in embodiments of the invention; and FIG. 3 is an enlarged portion of a typical chart produced when using the invention.

Figure 6:
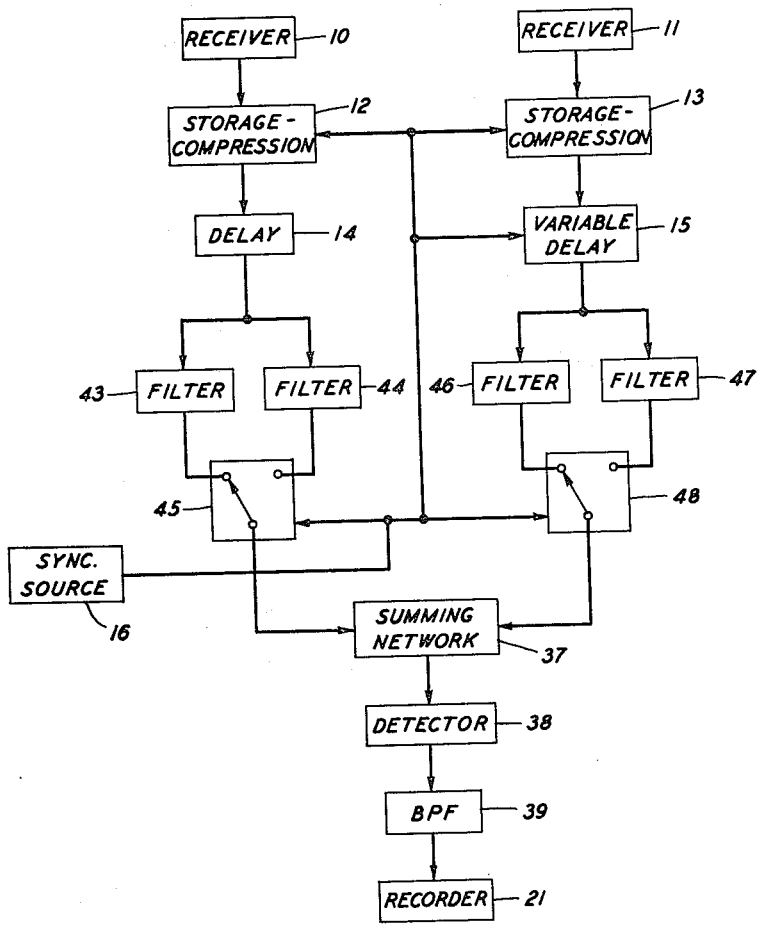

The block diagram of FIG. 1 includes a pair of receivers 10 and 11. Receivers 10 and 11 may, for example, comprise a pair of hydrophones with associated amplifiers and modulators. The outputs of receivers 10 and 11 are applied to a pair of storage-compression units 12 and 13, respectively. Storage-compression units 12 and 13 temporarily record successive portions of the outputs from receivers 10 and 11 and continuously scan these temporary portions to produce outputs in which successive portions of the receiver outputs are time compressed and repeated at least once. The output from storage-compression unit 12 is applied to a fixed delay device 14 while the output from storage-compression unit 13 is applied to a variable delay device 15. Variable delay device 15 and storage-compression units 12 and 13 are all controlled by a source 16 so that units 12 and 13 operate in synchronism and variable delay device 15 sweeps through its complete delay range for each compressed portion. The outputs from delay devices 14 and 15 are applied to a multiple-integrator 17 whose output in turn is applied to a pair of filters 18 and 19. Filter 18 has a broad-band transmission characteristic while filter 19 has a narrow-band transmission characteristic. Narrow-band filter 19 is adapted to pass substantially only those components of the output from multiplier-integrator 17 which corresponds to the narrow-band signals emitted by the objects whose bearing angle is to be found. (The term "to pass substantially only" as used is this description and the appended claims is intended to mean that signals outside the frequency band of interest are subjected to at least three decibels more attenuation than the minimum attenuation to which the signals of interest are subjected.) The outputs of filters 18 and 19 are alternately switched by a switch 20 to a recorder 21. Switch 20 is controlled by the output from source 16 so that the output from multiplier-integrator 17 which corresponds to alternate compressed portions of the input signals is passed through filter 18 to recorder 21 while the output from multiplier-integrator 17 which corresponds to the remaining compressed portions of the input signals is passed through filter 19 to recorder 21.

FIG. 2 illustrates a storage-compression and variable delay arrangement that may be used in practicing the invention. In FIG. 2, a magnetic drum 22 is rotated in a clockwise direction by a drive motor 23 past a fixed recording head 24 and a fixed erasing head 25. Heads 24 and 25 are arranged so that erasing head 25 removes any recording on each part of drum 22 just prior to the return of that part of the drum to recording head 24. A drive motor 26 causes a pick-up head 27 to rotate in a clockwise direction within drum 22 at three times the rotational speed of drum 22. The portion of the arrangement of FIG. 2 explained thus far time compresses successive portions of an input signal and may be used for storage-compression units 12 and 13 of FIG. 1.

Variable delay may be introduced into the output of the arrangement of FIG. 2 by rocking the stator of drive motor 26. This is accomplished in FIG. 2 by a motor 28 which causes a cam 29 to rotate which in turn works against a lever 30 mounted on the stator of drive motor 26. The complete arrangement shown in FIG. 2 may therefore be used for storage-compression unit 13 and variable delay device 15 of FIG. 1.

An enlarged portion of a typical chart produced by recorder 21 of FIG. 1 is shown in FIG. 3. When being produced, the chart was advanced in the direction indicated by the small arrow alongside the chart. Furthermore the stylus was moved back and forth across the chart in synchronism with the delay introduced by variable delay device 15. The horizontal axis of the chart therefore represents bearing angles.

When the portion of the chart illustrated in FIG. 3 was produced, two broad-band energy emitting objects were in the field of interest. Furthermore, the object of interest also emitted a substantially continuous narrow-band signal. The first or top set of broken lines was produced when narrow-band filter 19 was switched into the circuit. Filter 19 was adapted to pass substantially only those components of the output from multiplier-integrator 17 which corresponded to the narrow-band signals emitted by the object of interest. Each mark indicates that the delay introduced by variable delay device 15 was sufficient to produce a correlation output. Stated in another manner, the total delay introduced by variable delay device 15 was at least six times the period of the components of the compressed portions that corresponded to the narrow-band signals emitted by the object of interest. On the next traverse of the stylus, broad-brand filter 18 was switched into the circuit and, as two broad-band emitting objects were in the field of interest, two marks were made on the chart. Filters 18 and 19 were alternately switched into the circuit for successive traverses of the stylus to produce the remaining marks on the chart.

Considering the chart of FIG. 3 in greater detail, it will be noted that one set of broad-band marks progresses with time from the right-hand side of the chart to the left-hand side while the other set progresses from the left-hand side to the right-hand side, thus indicating that the bearing angles of both objects were changing with time. It will also be noted that the broad-band marks that progress from left to right are aligned with one mark from each broken line produced when narrow-band filter 19 was switched into the circuit while the broad-band marks that progress from right to left are not aligned in such a manner. The aligned broad-band and narrow-band marks, which are easily discernable from the remaining marks, indicate the bearing angle of the object of interest.

Another embodiment of the invention is shown in FIG. 4. As this embodiment is similar to that shown in FIG. 1, elements corresponding to those in the embodiment of FIG. 1 have been assigned the same symbols as those of FIG. 1. The embodiment of FIG. 3 differs from that of FIG. 1 in that broad-band and narrow-band filters have been placed in the signal paths so that broad-band portions of alternate time-compressed portions and narrow-band portions of the remaining time-compressed portions are passed to multiplier-integrator 17. In particular, a broad-band filter 31 and a narrow-band filter 32 are alternately switched by a switch 33 into the signal path between delay device 14 and multiplier-integrator 17 while a broad-band filter 34 and a narrow-band filter 35 are alternately switched by a switch 36 into the signal path between variable delay device 15 and multiplier-integrator 17. Furthermore, the output from multiplier-integrator 17 is now directly applied to recorder 21. The operation of the embodiment is similar to that of FIG. 1, the only difference being that the alternating filtering action occurs before multiplier-integrator 17 instead of after this element.

It will be noted that the embodiment of FIG. 1 requires two filters while that of FIG. 4 requires four filters. Furthermore, the filters in the embodiment of FIG. 1 sometimes provide sufficient integrating action to permit the integrator portion of multiplier-integrator 17 to be eliminated. The embodiment of FIG. 1 is therefore frequently desirable from an equipment standpoint over that of FIG. 4. Because, however, the filters are located in different places within the embodiments and therefore require different pass-bands to produce the same result, it may be found that in some applications the embodiment of FIG. 4 is desirable from an equipment standpoint over that of FIG. 1.

Still another embodiment of the invention is shown in FIG. 5. Elements corresponding to those in the previously described embodiments have been assigned the same symbols. This embodiment differs in one respect from the previously described embodiments in the manner in which correlation detection is achieved. In the present embodiment correlation detection is achieved by summing the delayed compressed signals in a summing network 37, detecting the summing network output in a detector 38 and passing the detector output through a band-pass filter 39 to recorder 21. Connected in the signal path between summing network 37 and detector 38 are a broad-band filter 40, a narrow-band filter 41 and a switch 42. Filters 40 and 41 are alternately switched into the signal path with the occurrence of the outputs from summing network 37 that correspond to the compressed portion inputs. This embodiment operates in a manner similar to that of FIG. 1.

The embodiment of the invention shown in FIG. 6 is similar to that of FIG. 5, the only difference being in the manner in which the filtering action is achieved. In this embodiment, a broad-band filter 43 and a narrow-band filter 44 are alternately switched by a switch 45 into the signal path between delay device 14 and summing network 37, while a broad-band filter 46 and a narrow-band filter 47 are alternately switched by a switch 48 into the signal path between variable delay device 15 and summing network 37. The operation of this embodiment is similar to those of the previously described embodiments.

Although only one time compressing arrangement was discussed in detail with respect to the present invention, it is to be understood that various other arrangements may be employed. The particular arrangement to be used will depend, among other things, upon the frequency range of the signals to be time compressed. Recirculating delay lines and magnetic core arrangements may, for example, be used in embodiments of the invention.

Although several specific embodiments of the invention have been described, various other embodiments may be devised by those skilled in the art without departing from the spirit and scope of the invention.

What is claimed is:

1. In combination first and second signal sources, means for continuously time compressing successive portions of the output of said first source to produce a first time compressed output in which each of the time-compressed portions is repeated at least once, means for continuously time compressing successive portions of the output of said second source to produce a second time-compressed output in which each of the time compressed portions is repeated at least once, means for correlating substantially only those components of alternate ones of said time-compressed portions in one of said time-compressed outputs that are within a first frequency band with substantially only those components of the corresponding time-compressed portions in the other of said time-compressed outputs that are within said first frequency band and substantially only those components of the remaining ones of said time-compressioned portions in one of said time-compressed outputs that are within a second frequency band less than said first frequency band with substantially only those components of the corresponding portions in the other of said time-compressed outputs that are within said second frequency band, and means for recording each of the outputs of said correlating means as a function of the delay introduced by said correlating means.

2. A combination in accordance with claim 1 where said correlating means comprises means for delaying in a continually varying manner one of said time-compressed outputs with respect to the other of said time-compressed outputs, means for comparing said time-compressed outputs for various values of said delay and deriving an output related to the degree of similarity between said time-compressed outputs, and means for making available both said comparing means output that corresponds to substantially only the components of the alternate compressed portions in said compressed outputs that are within said first frequency band and said comparing means output that corresponds to substantially only the components of the remaining said compressed portions that are within said second frequency band.

3. A combination in accordance with claim 2 in which the last mentioned means comprises a first pass-band filter, a second pass-band filter having a pass-band less than that of said first filter, and means for alternately switching said filters into the output circuit of said comparing means.

4. A combination in accordance with claim 1 where said correlating means comprises first means for passing substantially only those components of alternate time-compressed portions in one of said time-compressed outputs that are within said first frequency band and substantially only those components of the remaining time-compressed portions in the same time-compressed output that are within said second frequency band, second means for passing in a variously time delayed manner substantially only those components of alternate time-compressed portions in the other of said time-compressed outputs that are within said first frequency band and substantially only those components of the remaining time-compressed portions in the same time-compressed output that are within said second frequency band and means for comparing said components passed by said first and second means and deriving an output related to the similarity between said components.

5. A combination in accordance with claim 4 wherein said first means comprises a first pass-band filter, a second pass-band filter having a pass-band less than that of said first pass-band filter and means for alternately connecting said filters into said correlating means, and said second means comprises a first pass-band filter having a pass-band equal to that of said first means first pass-band filter, a second pass-band filter having a pass-band equal to that of said first means second pass-band filter, means for alternately connecting said second means filters into said correlating means, and means for variously delaying the inputs of said second means filters.

6. In combination first and second receiving means spaced apart with respect to one another, means for temporarily recording on first and second recording media the outputs from said first and second receiving means, respectively, means for continuously scanning said recording media at at least twice the rate at which said first and second receiving means outputs are recorded to produce a pair of time-compressed outputs in which successive portions of said first and second receiving means outputs are time compressed and repeated at least once, means for correlating in a broad-band sense alternate ones of said time-compressed portions in one of said time-compressed outputs with corresponding time-compressed portions in the other of said time-compressed outputs and in a narrow-band sense the remaining ones of said time-compressed portions in one of said time-compressed outputs with the corresponding time-compressed portions in the other of said time-compressed outputs, and means for recording the output of said correlating means as a function of the delay introduced by said correlating means.

7. A combination in accordance with claim 6 where said correlating means comprises means for delaying in a continually varying manner one of said time-compressed outputs with respect to the other of said time-compressed outputs, means for comparing said time-compressed outputs for various values of said delay and deriving an output related to the degree of similarity between said time-compressed outputs, and means for making available both said comparing means output that corresponds to substantially only the components of the alternate-compressed portions in said compressed outputs that are within said broad-band and said comparing means output that corresponds to substantially only the components of the remaining said compressed portions that are within said narrow-band.

8. A combination in accordance with claim 7 in which the last-mentioned means comprises a first pass-band filter, a second pass-band filter having a pass-band less than that of said first filter, and means for alternately switching said filters into the output circuit of said comparing means.

9. A combination in accordnce with claim 6 where said correlating means comprises first means for passing substantially only those components of alternate time-compressed portions in one of said time-compressed outputs that are within said broad-band and substantially only those components of the remaining time-compressed portions in the same time-compressed output that are within said narrow-band, second means for passing in a variously time delayed manner substantially only those components of alternate time-compressed portions in the other of said time-compressed outputs that are within said broad-band and substantially only those components of the remaining time-compressed portions in the same time-compressed output that are within said narrow-band and means for comparing said components passed by said first and second means and deriving an output related to the similarity between said components.

10. A combination in accordance with claim 9 wherein said first means comprises a first pass-band filter, a second pass-band filter having a pass-band less than that of said first pass-band filter and means for alternately connecting said filters into said correlating means, and said second means comprises a first pass-band filter having a pass-band equal to that of said first means first pass-band filter, a second pass-band filter having a pass-band equal to that of said first means second pass-band filter, means for alternately connecting said second means filters into said correlating means, and means for variously delaying the inputs of said second means filters.

References Cited in the file of this patent

UNITED STATES PATENTS

| | | |
|---|---|---|
| 2,166,991 | Guanella | July 25, 1939 |
| 2,958,039 | Anderson | Oct. 25, 1960 |